United States Patent [19]

Lipshultz et al.

[11] Patent Number: 4,856,559

[45] Date of Patent: Aug. 15, 1989

[54] FAUCET PROVIDING AND UTILIZING AIR GAP

[75] Inventors: Mitchell Lipshultz, Ft. Lauderdale; Alfred J. Lipshultz, Coconut Creek, both of Fla.

[73] Assignee: Aquathin Corp., Ft. Lauderdale, Fla.

[21] Appl. No.: 215,862

[22] Filed: Jul. 6, 1988

Related U.S. Application Data

[63] Continuation-in-part of Ser. No. 842,165, Mar. 21, 1986, Pat. No. 4,759,844.

[51] Int. Cl.$^4$ .............................................. E03C 1/10
[52] U.S. Cl. ..................................... 137/801; 137/216; 210/418
[58] Field of Search ................... 137/216, 562, 801; 210/257.2, 321.6, 418, 423

[56] References Cited

U.S. PATENT DOCUMENTS

| | | | |
|---|---|---|---|
| 3,620,241 | 11/1971 | Brown | 137/216 |
| 3,967,638 | 7/1976 | Tondreau | 137/216 |
| 4,134,419 | 1/1979 | Richetti | 137/46 |
| 4,210,533 | 7/1980 | Astl | 137/216 X |
| 4,391,712 | 7/1983 | Tyler et al. | 210/257.2 X |
| 4,454,891 | 6/1984 | Dreibelbis et al. | 137/216 |
| 4,599,171 | 7/1986 | Padilla et al. | 210/257.2 |
| 4,635,673 | 1/1987 | Gerdes | 137/216 |
| 4,744,895 | 5/1988 | Gales | 210/257.2 X |

*Primary Examiner*—Gerald A. Michalsky
*Attorney, Agent, or Firm*—Charles E. Baxley

[57] ABSTRACT

A faucet includes a body and first and second independent liquid conduit systems passing through the body, for handling first and second liquids, which may be respectively pure water from a water purification system and waste water (brine) generated by reverse osmosis in the purification system. The first conduit system has lower, upper and intermediate tubular portions, the latter providing a passage between the lower and upper portions. A handle is movable between a position in which the passage is closed and a position in which the passage is open. The second conduit system is a tube which is always open and which has a liquid inlet and a liquid outlet end, the liquid inlet end being connectible to the waste water (brine) line and the liquid, with the liquid outlet end spaced above and providing a gap with the maximum level of liquid in a sink.

1 Claim, 1 Drawing Sheet

U.S. Patent  Aug. 15, 1989  4,856,559
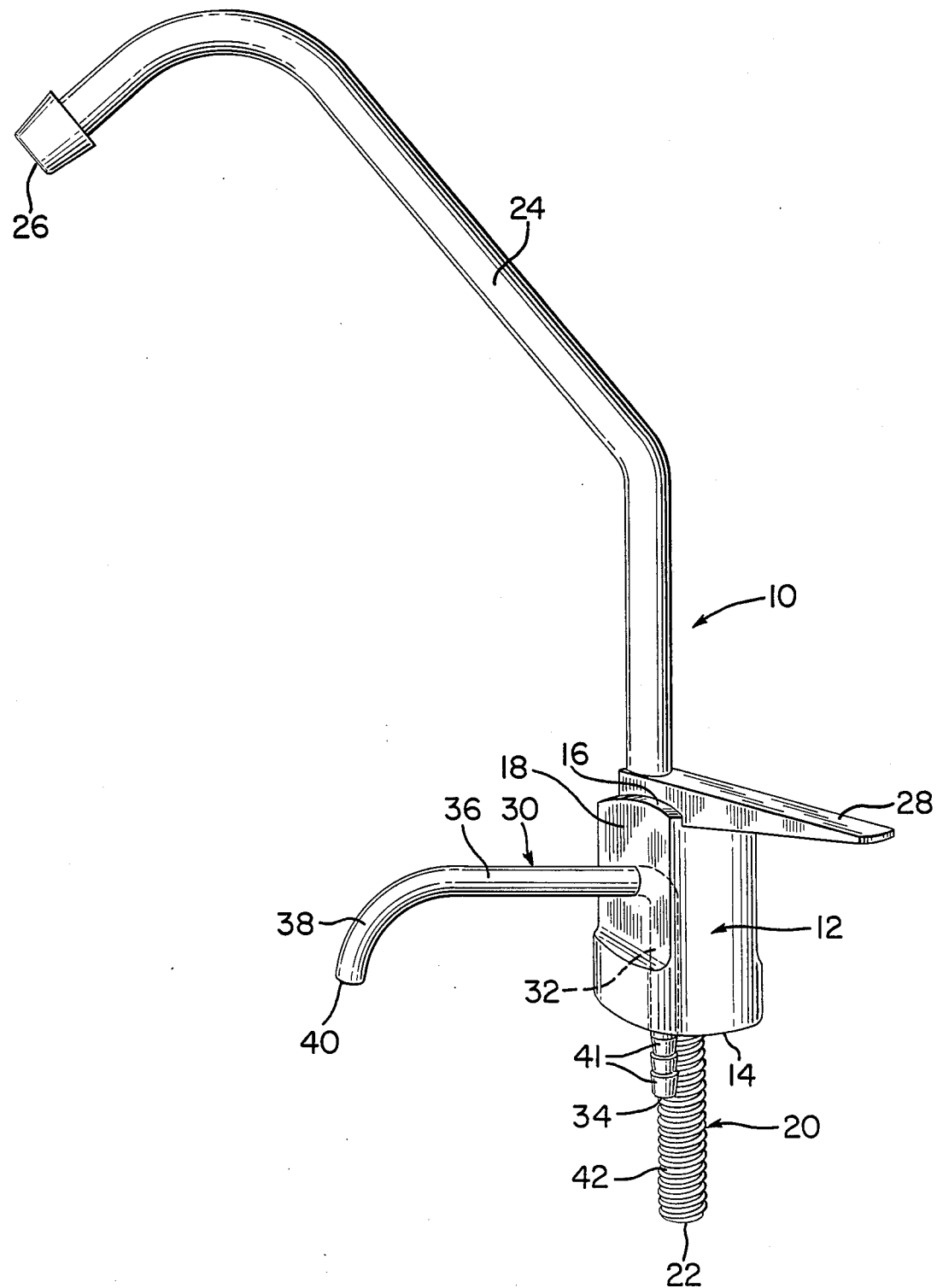

FAUCET PROVIDING AND UTILIZING AIR GAP

RELATED APPLICATION

The present invention has particular utility in connection with a portable water purification system of the general type disclosed in our copending U.S. patent application Ser. No. 842,165 which, was filed March 21, 1986 and allowed Jan. 29, 1988, now U.S. Pat. No. 4,759,844, and of which the present Application is a continuation-in-part.

BACKGROUND OF THE INVENTION

The present invention relates to an improved faucet and more particularly to a carafe-type faucet and still more particularly to a carafe-type faucet providing and utilizing an air gap for handling waste water (brine) which is generated by reverse osmosis in a portable water purification system, in locations where a direct tap into a sink trap is prohibited by plumbing codes or simply objected to by plumbing inspectors.

A prior carafe-type faucet which has been used for this purpose, has a brine line connected to it. The prior faucet has a welled area with a port, and after the brine enters the faucet, it flows across the welled area and out through the port and then enters the trap. However, the prior carafe-type faucet is subject to the disadvantage that water can spray out from under the faucet handle.

Accordingly, it is an important general object of the invention to provide an improved faucet.

It is another important object of the invention to provide an improved carafe-type faucet which provides and utilizes an air gap, the improved faucet having particular utility in handling waste water (brine) which is generated by reverse osmosis in a water purification system.

It is a further important object of the invention to provide such an improved carafe-type faucet which avoids the necessity of making a direct tap into a sink trap.

It is still another object of the invention to provide such an improved carafe-type faucet which overcomes the disadvantage of a prior carafe-type faucet which permits water to spray out from under the faucet handle.

It is yet a further object of the invention to provide such an improved carafe-type faucet which is of simple, economical and reliable construction.

The above and other objects and advantages will appear hereinafter.

SUMMARY OF THE INVENTION

A carafe-type faucet according to the invention comprises a body having a lower end which lies in a plane, an upper end and a sidewall therebetween, and first and second independent liquid conduit systems. The first conduit system has a lower tubular portion entering the lower body end and having a liquid inlet end, an upper tubular portion leaving the upper body end and having a liquid outlet end. The first conduit system also has an intermediate tubular portion within the body and providing a passage between the lower and upper tubular portions, and an operating handle movable in toggle-like fashion between a first position in which the passage is closed and a second position in which the passage is open to permit liquid under pressure to pass through the first conduit system. The second conduit system is an unobstructed tube having a lower portion entering the lower body end and having a liquid inlet end, and an upper portion passing through the body sidewall and having a liquid outlet end above the plane of the lower body end.

The liquid inlet end of the first conduit system is connectible to a source of a first liquid, such as purified water from a water purification system, and the liquid inlet end of the second conduit system is connectible to a source of a second liquid, such as waste water (brine) from a reverse osmosis unit of the purification system.

The faucet is mountable adjacent a sink with the outlet ends of the first and second conduit systems above the high water level of the sink, so that there is a vertical gap between the outlet end of the second conduit system and the water in the sink.

DESCRIPTION OF THE DRAWING

The sole drawing FIGURE is a perspective view of a faucet which is a preferred embodiment of the invention.

DESCRIPTION OF THE INVENTION

The FIGURE shows a preferred faucet 10 comprising a body 12 having a lower end 14, an upper end 16 and a sidewall 18 therebetween. Lower body end 14 lies in a plane. Faucet 10 further comprises first and second independent liquid conduit systems. The first conduit system has a lower tubular portion 20 which enters lower body end 14 perpendicularly to the plane thereof, lower tubular portion 20 having a liquid inlet end 22.

The first conduit system also has an upper tubular portion 24 which leaves upper body end 16 and has a liquid outlet end 26. The first conduit system also has an intermediate tubular portion (not shown but common in carafe-type faucets) within body 12 and providing a passage between lower and upper tubular portions 20 and 24, respectively. Faucet 10 further has an operating handle 28 which is movable in toggle-like fashion between a first or horizontal position (shown) in which the passage is closed and a second or vertical position (not shown) in which the passage is open, to permit liquid under pressure to pass through the first conduit system and leave same through outlet end 26.

The second conduit system is an unobstructed tube 30 having a lower portion 32 entering lower body end 14 perpendicularly to the plane thereof and having a lower liquid entering end 34, and an upper portion 36 passing through body sidewall 18 perpendicularly to lower portion 32 and smoothly curved downwardly as indicated at 38 to a liquid outlet end 40 which is located above the plane of lower body end 14. Tube 30 is provided with external circumferential ridges 41 adjacent end 34. Lower tubular portion 20 of the first conduit system is provided with external threads 42 so that faucet 10 can be mounted with lower body end 14 on a horizontal surface (not shown) adjacent to or part of a sink, with lower portion 20 extending through a hole in the horizontal surface and a nut (not shown) threadedly engaging threads 42. The first conduit system can be connected to a source of a first liquid, such as purified water in the reservoir or holding tank (not shown) of a water purification system such as that of the aforementioned Pat. No. 4,759,844.

The system of said U.S. Pat. No. 4,759,844 includes a reverse osmosis unit which generates waste water (brine) which must be gotten rid of in some fashion. Historically, the brine line has been tapped directly into the sink trap. However, many city plumbing codes prohibit such direct tapping, on the theory that if the trap becomes clogged and backs up, gasses and sewage could enter the system.

The second conduit system of faucet 10 solves the problem of getting rid of the waste water (brine). To accomplish this end, a tube (not shown) for carrying waste water (brine) from the water purification system is passed over end 34 of tube 30 and secured to ridges 41 in known fashion, with faucet 10 mounted on the horizontal surface and with end 40 of tube 30 over the sink.

In result, faucet 10 provides an air gap between outlet end 40 of tube 30 and the sink, it being noted that outlet 40 is above lower body end 14 and therefore is also above the highest level of liquid in the sink.

Tube 30 may be about 0.25 inch (0.64 cm) in diameter and may protrude about 2 inches (5.08 cm) from sidewall 18 of body 12, and outlet end 40 may be about 1 inch (2.54 cm) below upper portion 36.

It is evident that the invention attains the aforesaid objects and advantages and others.

The disclosed details are exemplary only and are not to be taken as limitations on the invention except as those details may be included in the appended claims.

What is claimed is:

1. A carafe-type faucet arrangement for use in a brinewater system and for detachable connection to a horizontal surface, said carafe-type faucet arrangement comprising in combination:

a body having a lower end and an upper end and an intermediate portion having a sidewall therebetween, first and second independent liquid conduit systems for handling first and second liquids respectively, said first and second liquid conduit systems passing through said body in spaced parallel relationship to each other;

said first conduit system including a lower tubular portion entering said body at the lower end thereof and said lower end forming a liquid inlet end, said first conduit having an upper tubular portion and forming a liquid outlet end, said first conduit system having an intermediate portion within said intermediate portion to provide a passage between said lower and said upper tubular portions, and a handle operatively connected to a valve in said passage and movable between a first position in which said passage is closed and a second position in which said passage is open to permit said first liquid to pass through said first conduit system;

said second conduit system being an unobstructed tube having a lower tubular portion entering said lower body end and having a liquid inlet end, said second conduit system including a straight upper portion passing through said body sidewall and leading to a liquid outlet end above said lower end;

said lower tubular portion of said first conduit system connectable to a source of said first liquid and said lower tubular portion of said second conduit system being connectable to a source of said second liquid, the lower tubular portion of said first conduit system being externally threaded and said faucet being mountable onto a horizontal surface so that said lower tubular portion of said first conduit system may extend through a hole in said horizontal surface and be detachably connected thereto.

* * * * *